US009527600B2

(12) United States Patent
Russ et al.

(10) Patent No.: US 9,527,600 B2
(45) Date of Patent: Dec. 27, 2016

(54) RAM AIR TURBINE GENERATOR ASSEMBLIES

(71) Applicant: HAMILTON SUNDSTRAND CORPORATION, Charlotte, NC (US)

(72) Inventors: David Russ, Rockford, IL (US);
Stephen Bortoli, Roscoe, IL (US);
Jeffrey Baldwin, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 180 days.

(21) Appl. No.: 14/280,589

(22) Filed: May 17, 2014

(65) Prior Publication Data

US 2015/0329215 A1    Nov. 19, 2015

(51) Int. Cl.
*B64D 41/00* (2006.01)
*F01D 15/12* (2006.01)
*H02K 7/20* (2006.01)
*F01D 15/10* (2006.01)
*F03D 9/00* (2016.01)
*H02K 7/18* (2006.01)

(52) U.S. Cl.
CPC .............. *B64D 41/007* (2013.01); *F01D 15/10* (2013.01); *F01D 15/12* (2013.01); *F03D 9/00* (2013.01); *F03D 9/002* (2013.01); *H02K 7/183* (2013.01); *H02K 7/20* (2013.01); *F05B 2220/31* (2013.01); *Y02E 10/725* (2013.01)

(58) Field of Classification Search
CPC ........ H02K 7/20; H02K 17/34; H02K 16/025; B64D 41/007

USPC ......... 322/63, 17, 10; 290/4 R, 4 A, 4 B, 31, 290/38 R, 40 C; 310/115, 112, 113, 114; 60/788

See application file for complete search history.

(56) References Cited

U.S. PATENT DOCUMENTS

| 4,114,057 | A | * | 9/1978 | Esters | H02K 23/00 310/154.23 |
| 4,991,796 | A | * | 2/1991 | Peters | B64D 41/007 244/119 |
| 5,484,120 | A | * | 1/1996 | Blakeley et al. | 244/54 |
| 5,708,314 | A | * | 1/1998 | Law | F16H 3/10 310/103 |

(Continued)

OTHER PUBLICATIONS

Extended European Search Report dated Oct. 2, 2015 in European Application No. 15001484.3.

*Primary Examiner* — Tulsidas C Patel
*Assistant Examiner* — Sean Gugger
(74) *Attorney, Agent, or Firm* — Snell & Wilmer, L.L.P.

(57) ABSTRACT

A ram air turbine having a turbine with one or more blades, a strut having a drive section and a generator adapter section, a turbine shaft and bevel gear located within the drive section, a generator positioned within the generator adapter section of the strut and comprising an exciter and permanent magnet generator in the a turbine side, and a driveshaft having a pinion gear that engages with the bevel gear, wherein the driveshaft is removably coupled to the generator. The strut includes a cone positioned between the drive section and the generator adapter section, and the permanent magnet generator and the exciter are positioned inside of the cone of the strut. The generator utilizes a generator cover and a generator bearing, and the bearing engages with the driveshaft and the generator. The permanent magnet generator and the exciter are positioned within the cone of the generator cover.

15 Claims, 6 Drawing Sheets

(56) References Cited

U.S. PATENT DOCUMENTS

| | | | |
|---|---|---|---|
| 8,733,480 B2* | 5/2014 | Watanabe | B60K 6/543 180/65.22 |
| 2003/0189382 A1 | 10/2003 | Tornquist et al. | |
| 2004/0066098 A1 | 4/2004 | Doherty et al. | |
| 2011/0236218 A1* | 9/2011 | Russ et al. | 416/246 |
| 2012/0056601 A1* | 3/2012 | Spierling | 322/34 |
| 2012/0114485 A1 | 5/2012 | Russ | |
| 2012/0159964 A1* | 6/2012 | Huang et al. | 60/786 |
| 2012/0183402 A1* | 7/2012 | Bortoli | 416/170 R |
| 2012/0200184 A1* | 8/2012 | Takeuchi | H02K 16/00 310/112 |
| 2012/0269634 A1* | 10/2012 | Bortoli | F03D 9/00 416/170 R |
| 2012/0286516 A1* | 11/2012 | Chong et al. | 290/52 |
| 2013/0256453 A1* | 10/2013 | Russ | 244/54 |
| 2013/0259683 A1* | 10/2013 | Russ | 416/1 |
| 2014/0347019 A1* | 11/2014 | Lando et al. | 322/32 |

\* cited by examiner

RAM AIR TURBINE GENERATOR ASSEMBLIES

FIELD

The present disclosure relates to components of ram air turbines, and more particularly, to generator assemblies for use in ram air turbines.

BACKGROUND

Ram air turbines are generally used in aircraft to provide supplemental and/or emergency power to the aircraft by utilizing air flow to rotate a turbine. Ram air turbines can provide either electrical or hydraulic power. Electrical ram air turbines produce electrical power by transferring the rotation of the turbine to a generator. Ram air turbines can be located in the nose of the aircraft. However, in such configurations, the size and configuration of the ram air turbine bay envelope may cause the generator to be located too close to the blades, which can disturb the airflow behind the blades, causing the blades to prematurely fatigue. Therefore, it may be beneficial to provide a more compact generator that shifts the largest diameter section of the generator away from the blade path.

SUMMARY

A ram air turbine comprises a turbine comprising a blade, a strut removably coupled to the turbine and comprising a drive section and a generator adapter section, wherein the strut comprises a turbine shaft and bevel gear located within the drive section, a generator positioned within the generator adapter section of the strut and comprising a turbine side, wherein an exciter is positioned at the turbine side of the generator, and wherein a permanent magnet generator is located with a stator of the exciter, and a driveshaft having a pinion gear that engages with the bevel gear, wherein the driveshaft is removably coupled to the generator. The strut comprises a cone positioned between the drive section and the generator adapter section, and the permanent magnet generator and the exciter are positioned inside of the cone of the strut. A ratio of a distance from the blade to an outer perimeter of the generator to a radius of the generator adapter section of the strut is greater than 3. The generator further comprises a generator cover and a generator bearing, and the bearing engages with and maintains the relative positions of the driveshaft and the generator. The generator cover has a driveshaft pilot diameter and a generator pilot diameter and a cone. The permanent magnet generator and the exciter are positioned within the cone of the generator cover and within a main stator of the generator.

A generator for use in a ram air turbine comprises an exciter, and a permanent magnet generator, wherein the generator comprises a turbine side, wherein the exciter is positioned at the turbine side of the generator, and wherein the permanent magnet generator is located with a stator of the exciter. The generator further comprises a generator cover and a generator bearing, and the generator bearing engages with and maintains the relative positions of a driveshaft and the generator. The generator cover has a driveshaft pilot diameter and a generator pilot diameter. The permanent magnet generator and the exciter are positioned within a cone of the generator cover and within a main stator of the generator.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments can be realized and that logical and mechanical changes can be made without departing from the spirit and scope of the inventions. Thus, the detailed description herein is presented for purposes of illustration only and not for limitation. For example, any reference to singular includes plural embodiments, and any reference to more than one component or step can include a singular embodiment or step. Also, any reference to attached, fixed, connected or the like can include permanent, removable, temporary, partial, full and/or any other possible attachment option.

As used herein, "aft" refers to the direction associated with the tail (e.g., the back end) of an aircraft, or generally, to the direction of exhaust of the gas turbine. As used herein, "forward" refers to the directed associated with the nose (e.g., the front end) of an aircraft, or generally, to the direction of flight or motion.

Figure 1:
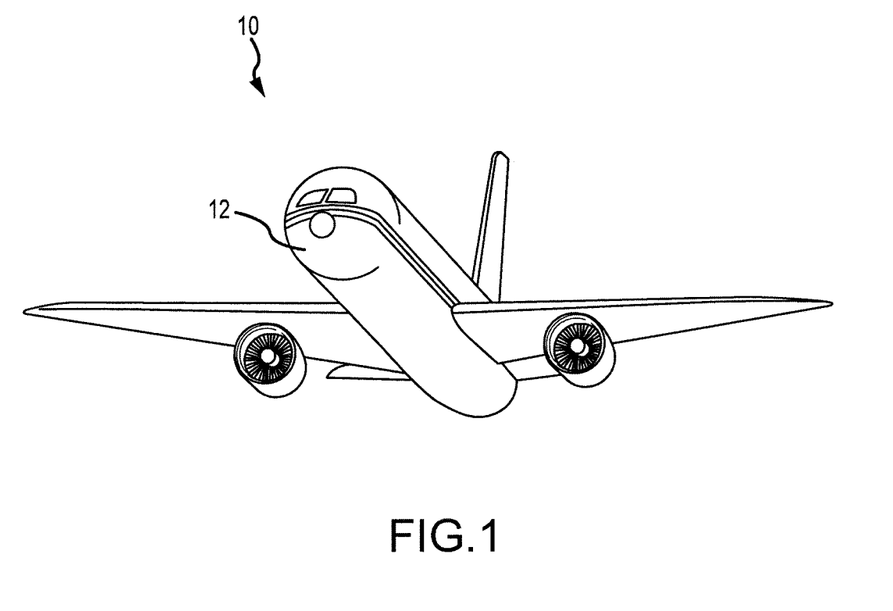
FIG. 1 illustrates a perspective view of an aircraft, in accordance with various embodiments.

In various embodiments and with reference to FIG. 1, an aircraft 10 can comprise a nose 12. A ram air turbine 100 can be located within nose 12 of aircraft 10, and when needed, ram air turbine 100 can be lowered out of nose 12 and into the path of airflow.

Figure 2A:
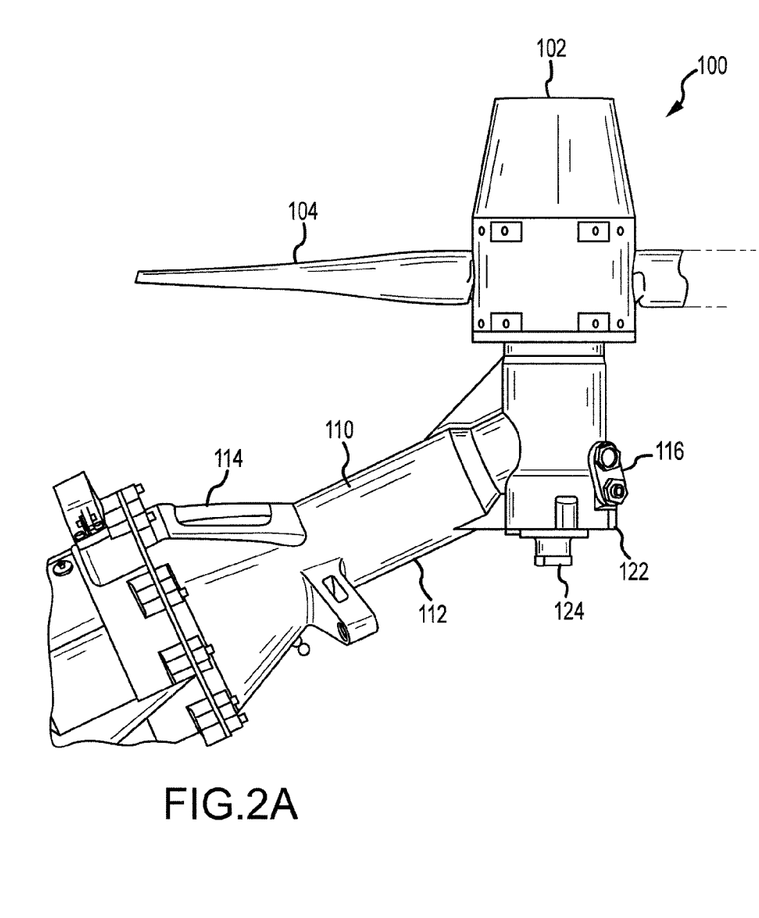
FIGS. 2A and 2B illustrate a perspective view and a cross sectional view of a ram air turbine of an aircraft, in accordance with various embodiments.
Figure 2B:
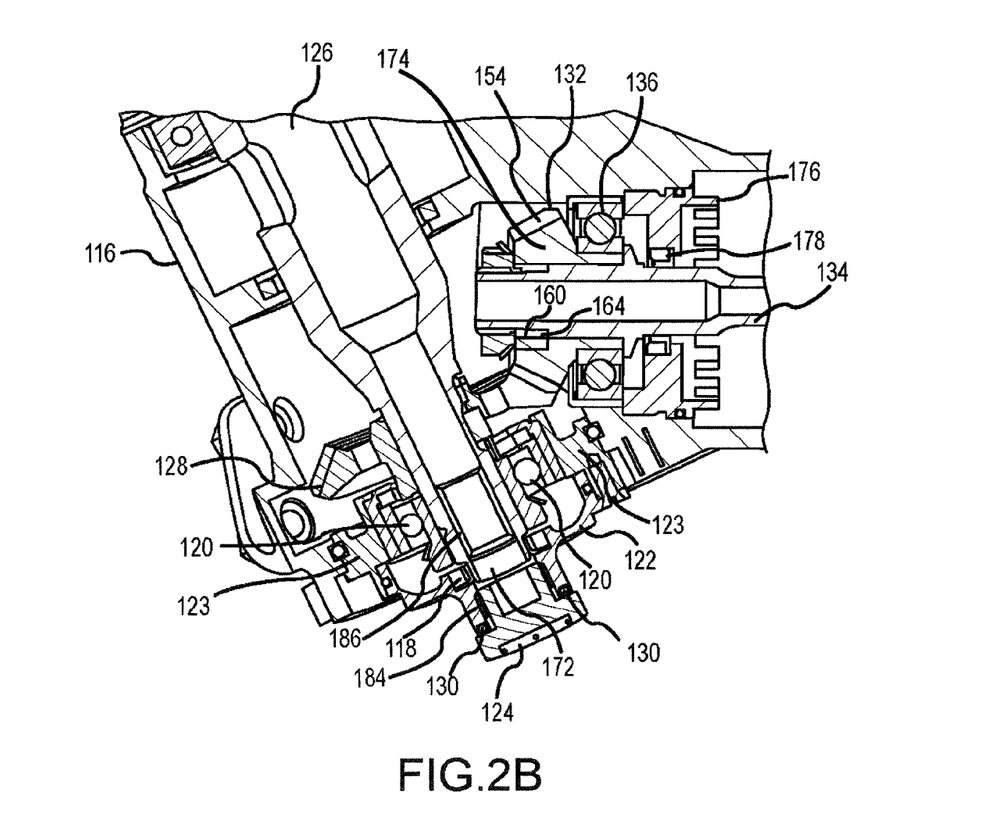

With reference to FIGS. 2A-2B, ram air turbine 100 can comprise, for example a turbine 102 having one or more blades 104. In various embodiments, turbine 102 is removably coupled to a strut 110. For example, strut 110 can be bolted to the rear of turbine 102.

In various embodiments, strut 110 may comprise a gearbox section 116, a drive section 112, and a generator adapter section 114. Strut 110 may be a one piece strut, comprising gearbox section 116, drive section 112, and generator adapter section 114 that are all integral to each other. In various embodiments, turbine 102 may be removably coupled to gearbox section 116 of strut 110.

Strut 110 may comprise a transition between drive section 112 and generator adapter section 114. For example, drive section 112 may have a reduced diameter in relation to generator adapter section 114, such that strut 110 comprises a cone-shaped transition region between drive section 112 and generator adapter section 114. As will be further discussed, in various embodiments, the various components of the ram air turbine that transfer rotational force of turbine 102 to a generator are located within gearbox section 116, drive section 112, and generator adapter section 114. As will be further described, many of these components may reside in one or more section of strut 110.

In various embodiments, gearbox section 116 comprises a turbine shaft 126 and a bevel gear 128. Turbine shaft 126 may, for example, be removably coupled to turbine 102, allowing turbine shaft 126 to rotate with the rotation of turbine blades 104.

Bevel gear 128 may be removably coupled to turbine shaft 126. For example, bevel gear 128 may be removably coupled to turbine shaft 126 by a spanner nut, a splined connection, or any other manner of coupling. Bevel gear 128 may be oriented perpendicularly to turbine shaft 126. In various embodiments, bevel gear 128 may comprise a beveled profile configured to interface with another gear and transmit rotation of turbine shaft 126 in a different direction. For example, as will be further discussed, bevel gear 128 can interface with a pinion gear to direct the rotational force of turbine 102 to a generator.

In various embodiments, an opposing end of turbine shaft 126 may be seated in a bearing 120 located within a bearing retainer 123. A cover 122 may, for example, be located at an opposite end of gearbox section 116 from turbine 102, and provide a seal for gearbox section 116 against outside contaminants. Further, in various embodiments, gearbox section 116, also referred to as a gearbox section, comprises lubricating fluid, and cover 122 may retain such fluid within gearbox section 116. Cover 122 may, for example, be secured to gearbox section 116 of strut 110 by one or more fasteners such as screws or bolts.

Figure 3:
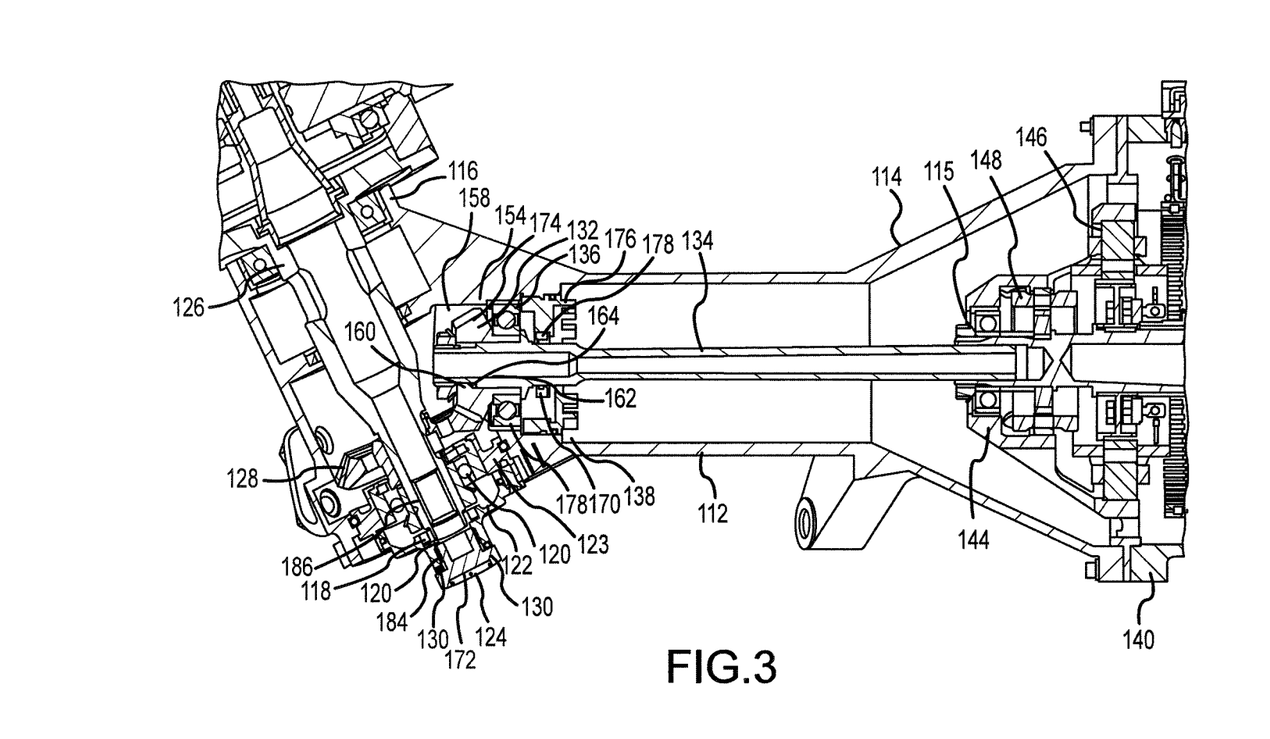
FIG. 3 illustrates a cross sectional view of a ram air turbine of an aircraft, in accordance with various embodiments.

With reference to FIG. 3, in various embodiments, drive section 112 of strut 110 may comprise a driveshaft 134. Driveshaft 134 may traverse drive section 112 and transfer rotation of turbine shaft 126 to generator 140.

In various embodiments, driveshaft 134 comprises a pinion gear 132. With reference to FIG. 3, in various embodiments, pinion gear 132 may comprise a gear body 174 and a gear face 154. Gear face 154 may comprise, for example, a gear tooth pattern that is complimentary to the pattern of bevel gear 128. In various embodiments, pinion gear 132 engages with bevel gear 128 to transfer rotation of turbine shaft 126 to driveshaft 134.

Pinion gear 132 may, for example, be secured to driveshaft 134 by a spanner nut. With reference to FIG. 3, in various embodiments, pinion gear 132 may comprise a key 160 configured to interact with a keyed joint 162 of driveshaft 134. In such embodiments, key 160 and keyed joint 162 may maintain the position of pinion gear 132 such that pinion gear 132 does not rotate independently of driveshaft 134. However, any manner of securing pinion gear 132 to driveshaft 134 is within the scope of the present disclosure.

In various embodiments, driveshaft 134 further comprises a pinion bearing 136. Pinion bearing 136 may be coupled to pinion gear 132 and facilitate rotation and positioning of pinion bearing 136 within drive section 112 of strut 110. Pinion gear 132 may further comprise, for example, a pinion retainer 176.

Driveshaft 134 may comprise, for example, a hollow shaft with an inner diameter and outer diameter. In other embodiments, driveshaft 134 may comprise a solid shaft.

Figure 4:
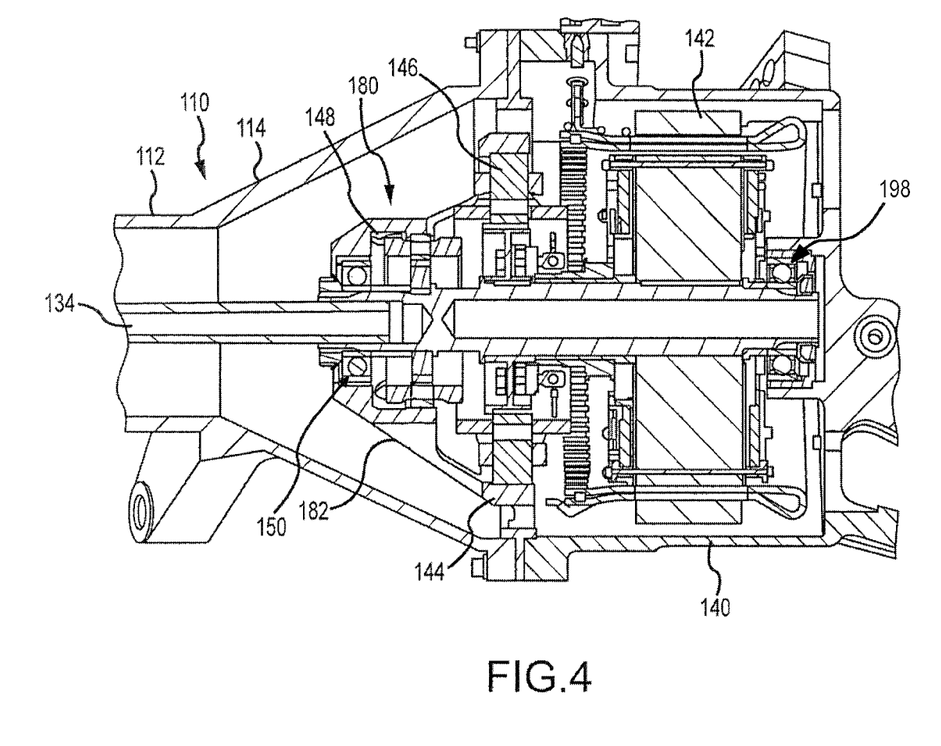
FIG. 4 illustrates a cross sectional view of a ram air turbine of an aircraft, in accordance with various embodiments.
Figure 5:
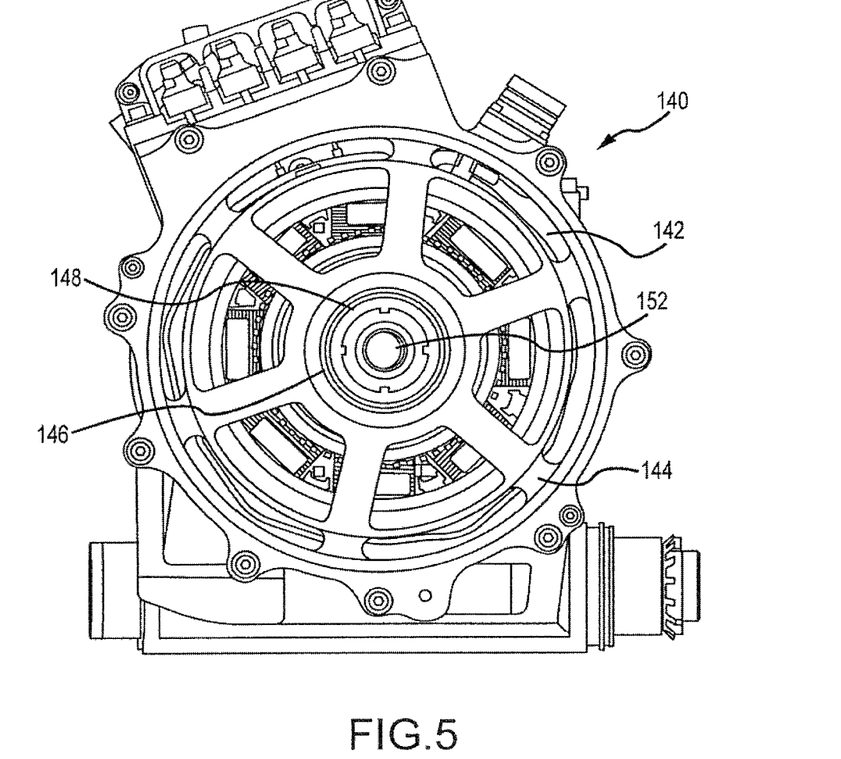
FIG. 5 illustrates an end view of a generator for use with a ram air turbine of an aircraft, in accordance with various embodiments.

With reference to FIGS. 4 and 5, in various embodiments, ram air turbine 100 comprises generator 140 located at least partially within generator adapter section 114 of strut 110. In various embodiments, the outside diameter of generator adapter section 114 is such that generator adapter section 114 does not interfere with the wake of blades 104 of turbine 102 during operation. Stated another way, the distance from one of blades 104 to the center of generator 140 is at least three times that of a projected radius of generator adapter section 114. Further, generator adapter section 114 may be generally free of protrusions, such that the exterior surface is relatively smooth. In such embodiments, the relative smoothness of the exterior surface of generator adapter section 114 may assist in reducing turbulence and blade fatigue.

Generator 140 may comprise, for example, a turbine end 180. In various embodiments, turbine end 180 is oriented towards driveshaft 134. Turbine end 180 may be at least partially located within a cone-shaped transition region between drive section 112 and generator adapter section 114 of strut 110. In various embodiments, generator 140 comprises a permanent magnet generator 148. Permanent magnet generators are typically located above the generator, at the end opposite turbine end 180. When the aircraft envelope is restricted, as is the case with many nose-located ram air turbine applications, locating permanent magnet generator 148 above generator 140 causes the rest of generator 140 to be located closer to the turbine blades. In contrast, in various embodiments of the present disclosure, permanent magnet generator 148 may be positioned at turbine end 180 of generator 140. Further, permanent magnet generator 148 may be at least partially surrounded by an exciter 146.

In various embodiments, permanent magnet generator 148 may be partially surrounded by a stator of exciter 146. In various embodiments, exciter 146 is at least partially surrounded by a main stator 142 of generator 140 to shorten the overall length.

In various embodiments, generator 140 comprises a generator cover 144. Generator cover 144 may comprise, for example, a cone 182 oriented towards drive section 112 and positioned in a transition region between drive section 112 and generator adapter section 114. In various embodiments, permanent magnet generator 148 and exciter 146 are located within cone 182 of generator cover 144. In various embodiments, by locating permanent magnet generator 148 and exciter 146 in proximity, both may be wired to a common external connector, and therefore would not require two separate connectors.

Cone 182 of generator cover 144 can also comprise a generator bearing 150. In various embodiments, an end of driveshaft 134 engages with generator bearing 150. In such embodiments, generator bearing 150 provides support to, indexes, and/or maintains the position of an end of driveshaft 134. Any manner of maintaining proper positioning of generator cover 144 and generator bearing 150 is within the scope of the present disclosure.

In various embodiments, generator 140 further comprises an upper generator bearing 198. The upper generator bearing 198 may, for example, be positioned concentrically within the main stator 142 of generator 140 to assist in positioning the largest diameter section of generator 140 out of the path of the turbine blades.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections can be present in a practical system.

However, the benefits, advantages, solutions to problems, and any elements that can cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone can be present in an embodiment, B alone can be present in an embodiment, C alone can be present in an embodiment, or that any combination of the elements A, B and C can be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A ram air turbine comprising:
   a turbine comprising a blade;
   a strut removably coupled to the turbine and comprising a drive section, a gearbox section, and a generator adapter section, wherein the gearbox section comprises a turbine shaft and bevel gear;
   a generator positioned within the generator adapter section of the strut and comprising a turbine side, wherein an exciter is positioned at the turbine side of the generator, and wherein a permanent magnet generator is located at least partially within a stator of the exciter, and
   a driveshaft having a pinion gear that engages the bevel gear, wherein the driveshaft is removably coupled to the generator,
   wherein the strut comprises a cone position between the drive section and the generator adapter section, and wherein the permanent magnet generator and the exciter are positioned within the cone of the strut.

2. The ram air turbine of claim 1, wherein a ratio of a distance from the blade to a projected radius of the generator adapter section of the strut is greater than 3.

3. The ram air turbine of claim 1, wherein the generator further comprises a generator cover and a generator bearing.

4. The ram air turbine of claim 3, wherein the generator bearing engages with and maintains the relative positions of the driveshaft and the generator.

5. The ram air turbine of claim 4, wherein the generator cover has a driveshaft pilot diameter and a generator pilot diameter.

6. The ram air turbine of claim 3, wherein the generator cover comprises a cone.

7. The ram air turbine of claim 6, wherein the permanent magnet generator and the exciter are positioned within the cone of the generator cover.

8. The ram air turbine of claim 1, wherein the permanent magnet generator and the exciter are positioned within and on the same side as a main stator of the generator.

9. A generator for use in a ram air turbine comprising:
   an exciter;
   a permanent magnet generator, wherein the generator comprises a turbine side, the exciter is positioned at the turbine side of the generator, and the permanent magnet generator is located within a stator of the exciter;
   a generator cover; and
   a generator bearing, wherein the permanent magnet generator and the exciter are positioned within a cone of the generator cover.

10. The generator of claim 9, wherein the generator bearing engages with and maintains the relative positions of a driveshaft and the generator.

11. The generator of claim 10, wherein the generator cover has a driveshaft pilot diameter and a generator pilot diameter.

12. The generator of claim 10, wherein the permanent magnet generator and the exciter are positioned within a main stator of the generator.

13. The ram air turbine of claim 1, wherein the gearbox section includes a cover removably coupled to the gearbox section, the cover being located at an opposite end of the gearbox section from the turbine.

14. The generator of claim 9, wherein the exciter is located at least partially surrounded by a main stator of the generator.

15. The generator of claim 9, wherein the cone of the generator cover is located within a cone-shaped portion or a strut.

* * * * *

UNITED STATES PATENT AND TRADEMARK OFFICE
CERTIFICATE OF CORRECTION

PATENT NO. : 9,527,600 B2
APPLICATION NO. : 14/280589
DATED : December 27, 2016
INVENTOR(S) : David Russ et al.

Page 1 of 1

It is certified that error appears in the above-identified patent and that said Letters Patent is hereby corrected as shown below:

In the Claims

In Column 6, Line 7, please delete "position" and insert therefore --positioned--

Signed and Sealed this
Twenty-third Day of May, 2017

Michelle K. Lee
*Director of the United States Patent and Trademark Office*